March 19, 1968

J. F. MAYBIN 3,373,564

PROCESS AND APPARATUS FOR CONTROLLING
ROCKET ENGINES AND THE LIKE

Filed April 26, 1966

INVENTOR.
Joseph F. Maybin
BY
Jennings Carter & Thompson
Attorneys 3,373,564
PROCESS AND APPARATUS FOR CONTROLLING
ROCKET ENGINES AND THE LIKE
Joseph F. Maybin, Birmingham, Ala., assignor to Hayes
International Corporation, a corporation of Delaware
Filed Apr. 26, 1966, Ser. No. 545,287
8 Claims. (Cl. 60—204)

This invention relates to a process and apparatus for determining the instant that the total impulse produced by a reaction engine or some similar engine reaches a preselected value. More particularly, this invention relates to a process and apparatus for use with any engine in which the force exerted or produced by the engine as a function of time bears a definite mathematical relationship, independent of the temperature of th eengine and fuel, to the integral of the combustion chamber pressure with respect to time, which process and apparatus utilizes the integral of the combustion chamber pressure with respect to time to determine the instant at which a predetermined amount of total impulse has been generated.

The primary object of my invention is to provide means for controlling the total impulse of a reaction engine such as a rocket without measuring an external ballistic parameter such as acceleration or velocity.

Another subject of my invention is to control the total impulse generated by a reaction engine by integrating the value of the combustion chamber pressure with respect to time in an analogue circuit, whereby when the value of the integral reaches a predetermined level, control sequences are initiated.

In view of the foregoing it is a specific object of my invention to control the zoning or range of a rocket vehicle by the means hereinbefore characterized and hereinafter described more fully.

In the past many attempts have been made to provide means for determining when the thrust of a rocket engine has reached a preselected value, but to my knowledge all of these attempts have required the measurement of an external ballistic characteristic such as acceleration or velocity, and/or have required the use of complex computer facilities for such determinations. In contrast to these methods I propose to measure an internal parameter of the rocket engine and utilize a very simple analogue circuit from which to derive a signal at the instant the total impulse exerted by the engine reaches a predetermined value, which signal may be utilized to control the rocket in any manner desired.

Total impulse may be equated to thrust and thus, in the flight equations of a rocket vehicle, to acceleration and ultimately to the range of a rocket vehicle. Thus, if total impulse can be computed from an internal parameter of the rocket motor the range of the vehicle can be determined without resorting to measurement of an external ballistic characteristic. The specific impulse of a rocket engine or motor varies as a function of temperature and the temperature coefficient of the propellent. As it is not practical to control the temperature environment, the operational temperature of the rocket will vary over wide extremes. In fact, actual soak temperature at the time of launch is practically impossible to determine due to variations throughout the grain itself.

I have found that the total impulse exerted by a rocket engine in flight over a predetermined range remains constant in spite of variations in the temperature of the grain. Thus, total impulse rather than specific impulse is the parameter by which I propose to control the rocket vehicle.

The integral of combustion chamber pressure with respect to time is proportional to total impulse. Total impulse is equal to some constant times the integral of the combustion chamber pressure with respect to time, as follows:

$$I_T = K \int P_c dt$$

where $I_T$ is total impulse, K a constant, $P_c$ combustion chamber pressure, and $t$ is time. It is this principle upon which my invention is based.

In the following description of my invention reference will be had to the accompanying drawing, which illustrates certain constructional features of my invention and which may be employed to carry out my improved processes, in which.

Figure 1:
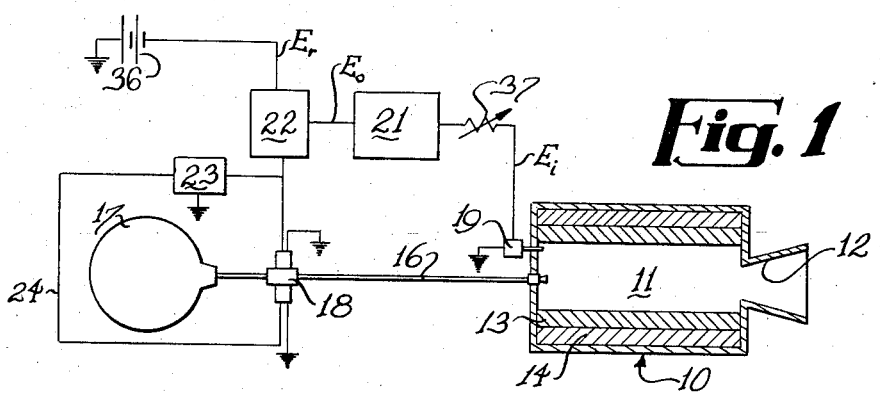
FIG. 1 is a diagrammatic view of a solid-hybrid rocket engine and an analogue circuit associated therewith for carrying out my invention.

In FIG. 1 I show diagrammatically a rocket engine indicated generally by the numeral 10. This engine comprises a combustion chamber 11 and exhaust nozzle 12. The engine illustrated is known as a solid-hybrid rocket, that is to say it is provided with two distinct fuel grains. The first of these fuel grains, indicated by the numeral 13, is of the type which includes its own oxidizing agent, whereas the second grain, indicated by the numeral 14, requires the addition of an oxidizer in order to sustain combustion. Oxidizer for the fuel grain 14 is supplied to the combustion chamber through a conduit 16 from a tank 17. The supply of oxidizer through the conduit 16 is under control of a valve 18. In operation, valve 18 is closed at the time of ignition, and thus only the booster grain 13 burns during the first part of the operation of the engine. For optimum performance of the rocket it is desirable to open the valve 18 and supply oxidizer to the engine after the combustion of the booster grain 13 has produced a certain amount of total impulse, or thrust. However, the burning rate of the fuel grain 13 varies widely with variations in soak temperature, a high temperature producing a very rapid rate of burning and thus a high specific impulse, while a lower temperature produces a slower rate of burning with a lower specific impulse. Thus, the instant at which valve 18 should be opened will vary depending upon the temperature conditions of the environment in which the engine is to be operated.

In order to determine the instant at which the total impulse exerted by the engine has reached the optimum value for initiating combustion of the second fuel grain 14, I provide a pressure transducer 19 which gives an electrical output signal which is proportional to the pressure within the combustion chamber 11. The signal from the transducer 19 is fed as an input signal to an analogue integrator indicated generally by the numeral 21. The output otf the integrator 21 is a second signal which is proportional to the integral of the input signal with respect to time, that is to say:

$$E_o = A \int E_i dt$$

where $E_i$ is the analogue signal from transducer 19, $E_o$ is the output signal from the integrator 21, and A is a constant.

The signal $E_o$ from the integrator 21 is fed to a detector circuit 22 where it is compared to a third signal $E_r$. The signal $E_r$, which may be called a reference signal, is the analogue of a predetermined value of the total impulse of the rocket engine, and is provided by a constant voltage source indicated generally by the numeral 36. When $E_o$, the analogue of the actual total impulse produced by the rocket engine, reaches a level equal to the value of $E_r$, namely, the reference signal, the circuit 22 provides an output command signal. This command signal is utilized in the apparatus shown in the diagram to open the valve 18, thus supplying oxidizer to the combustion chamber 11 to initiate combustion of the propellant 14. Since the total impulse exerted by the rocket engine 10 may be equated to thrust and thence to range, it is clear that the apparatus just described initiates combustion of the "second stage," so to speak of the hybrid engine, after the rocket has gone over a predetermined distance, regardless of the soak temperature of the propellant grain 13.

In the apparatus shown the propellant 14 is substantially unaffected by temperature and thus a timer, indicated generally at 23, provides sufficient control. After a predetermined period of time the timer provides a signal through the lead 24 to the valve 18 whereby the valve 18 is closed to terminate the operation of the engine. In the event that the propellent 14 is temperature sensitive, the signal $E_o$ from the integrater 21 is fed to a second detector similar to detector 22 whereby a signal is given when the engine has exerted a certain predetermined total impulse, thus to terminate operation of the motor 10.

Figure 3:
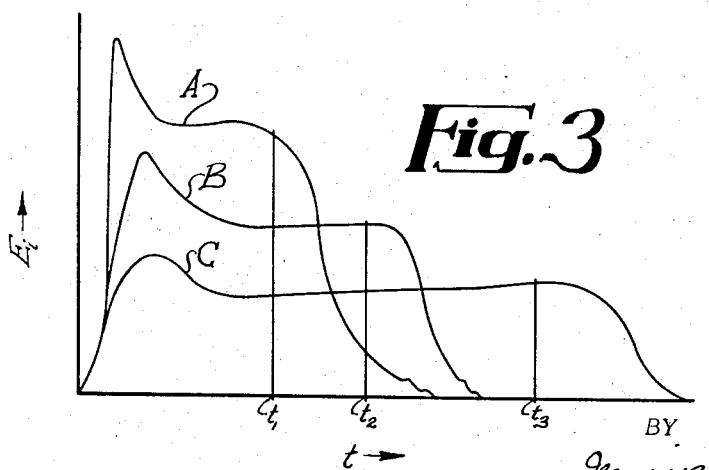
FIG. 3 is a series of curves illustrating the firing characteristics of a rocket engine at various soak temperatures.

Turning now to FIG. 3, I show a series of curves labeled A, B, and C. The abscissa represents combustion chamber pressure or more specifically the signal $E_i$ produced by the transducer 19, as the analogue of the combusion chamber pressure. The curve A represents the pressure-time characteristics during booster phase of a typical engine of the type under discussion fired under conditions of high ambient and soak temperatures. The curve C represents the pressure-time characteristics of such an engine fired under relatively low ambient and soak temperature conditions, and the curve B represents the characteristics of such an engine fired at intermediate temperature conditions. It will be noted that the total area under each curve, which represents total impulse, is substantially the same for each of the three curves. That is to say, the total impulse exerted by the engine fired under different temperature conditions, will at burnout, be a constant. However, the specific impulse of the engine fired at high temperature conditions and thus the output of the pressure transducer, is much greater than for the engine fired at a lower temperature. Thus specific impulse varies with the temperature conditions. By integrating the signal $E_i$ which is representative of the combustion chamber pressure, and thus proportional to the specific impulse of the engine, I obtain a signal representative of the area under the curve A, B, or C which is analogous to the total impulse produced by the engine during the time interval of integration. During the time interval from 0 to $t_1$ shown on the graph of FIG. 3 the total impulse exerted by the engine fired under the conditions of curve A is equal to the total impulse of the engine fired under the conditions of curve B at time $t_2$, and for the engine fired under conditions of curve C at time $t_3$. If the total impulse exerted by the engine fired under the conditions of curve A during the interval from 0 to time $t_1$ is the optimum total impulse for the engine, the value of the reference signal $E_r$ is set substantially equal to the value of the integral of $E_i$ from 0 to $t_1$ for the curve A. When the rocket has generated this much total impulse the detector 22 will produce a signal as hereinbefore described to initiate control sequences for the motor. This signal will be produced at time $t_2$ for the engine fired under conditions of curve B, and at time $t_3$ for conditions under curve C. Thus, no matter what the temperature conditons may be, I provide for a command signal when the rocket has exerted a predetermined total impulse, or in other words, when the rocket has arrived at a certain predetermined point in space, regardless how fast it may have covered the distance to that point.

Figure 2:
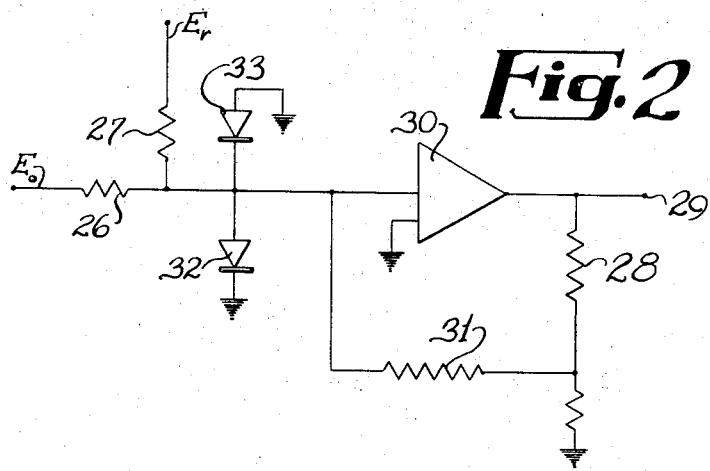
FIG. 2 is a diagram of the signal level detector utilized in FIG. 1.

In FIG. 2 I show a bridge circuit comprising resistors 26 and 27, which may have one meg-ohm value each. The signal $E_o$ from the integrator 21 is fed to the resistor 26, while the signal $E_r$, from a constant voltage source is fed to resistor 27. It will be understood that the polarity of $E_r$ will be opposite to that of $E_o$. The common point between the resistors is the input to a differential DC amplifier 30 with substantially infinite open loop gain which will accept millivolt input signals DC and provide an output of several volts. This amplifier may be any stable high gain differential DC operational amplifier. The load resistor to ground for the amplifier is indicated generally at 28, and the command signal is taken off at the point 29. A very small portion of the output of the amplifier is fed regeneratively back to the input through resistor 31, which has a very high value, such as 24 meg-ohms. The diodes 32 and 33 are provided to protect the input of the amplifier from an overload, these diodes being adapted to pass to ground any signal greater than a few millivolts. Thus when the absolute value of signal $E_o$ exceeds that of the signal $E_r$, the amplifier 30 produces a relatively large output. Since a portion of this output is fed regeneratively through resistor 31 back to the input of the amplifier 30 the amplifier is saturated and produces its maximum output as a constant command signal of several volts. This command signal may be utilized to initiate various control sequences such as, in the example described above, ignition of a second propellant grain, or in other applications ignition of another booster, termination of thrust, and the like.

To provide for variation of conditions, such as in the desired range, the output of the integrator may be varied by a potentiometer 37 in a manner well understood in the art.

While I have shown my invention in connection with a solid-hybrid rocket engine, it will be understood that it is operable with any reaction engine having a chamber wherein a fluid under pressure is utilized to provide the force for operation of the engine.

It will be noted that, although the embodiment illustrated comprises an electronic analogue circuit, appropriate pneumatic or hydraulic circuits may be employed in similar manner to provide the command signal.

From the foregoing it is seen that I have devised a new and improved process and apparatus for obtaining a control signal for rocket engines and the like, which will give a definite control of the range of the engine, and/or the power output of the engine, without resorting to measurement of external ballistic parameters and the like. I provide a simple inexpensive means for controlling such engines which is accurate over a wide range of conditions.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The process of obtaining a control signal for an engine of the type wherein a fluid under pressure is utilized to produce the force which operates the engine when the total impulse produced by said force reaches a predetermined value which comprises:
   (a) obtaining an analogue signal corresponding to the pressure of the fluid in the engine,
   (b) integrating said analogue signal with respect to time to obtain a second signal analogous to the total impulse produced during the time interval of integration, and
   (c) producing a control signal when said second signal reaches a predetermined value.

2. The process defined in claim 1 in which said control signal is obtained by comparing said second signal with a third signal of predetermined value analogous to a desired value of total impulse and producing said control signal when the absolute value of said second signal exceeds the absolute value of said third signal.

3. The process defined in claim 2 in which the control signal is produced by:
  (a) amplifying the portion of said second signal that exceeds said third signal, and
  (b) utilizing a portion of the amplified signal as a regenerative feed-back to produce the control signal by saturation of the amplifier.

4. The process of obtaining a control signal for a rocket engine when the total impulse produced by said engine reaches a predetermined value, which comprises:
  (a) obtaining an analogue signal corresponding to the pressure within the combustion chamber of the engine,
  (b) integrating said analogue signal with respect to time to obtain a second signal analogous to the total impulse produced during the time interval of integration, and
  (c) producing a control signal when said second signal reaches a predetermined value.

5. Apparatus for obtaining a control signal for an engine, of the type wherein a fluid under pressure is utilized to produce the force which operates the engine, when the total impulse produced by said force reaches a predetermined value, which comprises:
  (a) means to produce a first signal having a value at any instant corresponding to the pressure of the fluid in the engine at that instant,
  (b) means responsive to said first signal to produce a second signal corresponding to the value of the total impulse produced by the engine, and
  (c) means responsive to said second signal to produce a control signal upon attainment of a predetermined value of said second signal.

6. Apparatus as defined in claim 5 in which said means to produce a first signal comprises a pressure transducer.

7. Apparatus as defined in claim 6 in which said means responsive to said first signal comprises an analogue integrator having an output analogous to the integral of the pressure of the fluid in the engine with respect to time.

8. Apparatus as defined in claim 5 in which said means responsive to said second signal comprises:
  (a) a pair of substantially equal resistors connected at a common point, said second signal being fed to one of said resistors, and a third signal analogous to a desired value of total impulse being fed to the other of said resistors,
  (b) a high gain amplifier connected with its input at the common point between said resistors, and
  (c) a regenerative feed back circuit provided around the amplifier whereby a control signal is produced when the absolute value of said second signal exceeds the absolute value of said third signal.

References Cited
UNITED STATES PATENTS

| | | | |
|---|---|---|---|
| 2,924,964 | 2/1960 | Minke | 73—35 |
| 3,073,112 | 1/1963 | Bleikamp | 60—254 X |
| 3,168,807 | 2/1965 | Ledwith et al. | 60—233 X |

CARLTON R. CROYLE, *Primary Examiner.*